US011685814B2

(12) United States Patent
Brown et al.

(10) Patent No.: US 11,685,814 B2
(45) Date of Patent: Jun. 27, 2023

(54) INSULATION MATERIAL AND METHOD OF MAKING SAME

(71) Applicant: MgO Systems LTD., Calgary (CA)

(72) Inventors: Doug Brown, Calgary (CA); Todd McKay, Lethbridge (CA)

(73) Assignee: MGO SYSTEMS LTD., Calgary (CA)

( * ) Notice: Subject to any disclaimer, the term of this patent is extended or adjusted under 35 U.S.C. 154(b) by 807 days.

(21) Appl. No.: 16/676,150

(22) Filed: Nov. 6, 2019

(65) Prior Publication Data

US 2020/0140632 A1    May 7, 2020

Related U.S. Application Data

(60) Provisional application No. 62/756,337, filed on Nov. 6, 2018.

(51) Int. Cl.
| | |
|---|---|
| *C08J 5/10* | (2006.01) |
| *C08J 9/04* | (2006.01) |
| *C08J 5/04* | (2006.01) |
| *C08J 9/00* | (2006.01) |
| *B05B 7/24* | (2006.01) |

(52) U.S. Cl.
CPC ............. *C08J 5/046* (2013.01); *B05B 7/24* (2013.01); *C08J 5/10* (2013.01); *C08J 9/0004* (2013.01); *C08J 9/0023* (2013.01); *C08J 9/0028* (2013.01); *C08J 9/0066* (2013.01); *C08J 2327/06* (2013.01)

(58) Field of Classification Search
CPC ... C08J 5/046; C08J 5/10; C08J 9/0004; C08J 9/0023; C08J 9/0028; C08J 9/0066; C08J 2327/06; B05B 7/24; B05B 7/0037; B05B 7/267; B05B 7/32; C04B 2103/0067; C04B 28/30; C04B 2111/00155; C04B 2111/28; C04B 2201/20; C04B 28/32; Y02W 30/91
See application file for complete search history.

(56) References Cited

U.S. PATENT DOCUMENTS 3,989,534 A * 11/1976 Plunguian ............... C04B 28/02
106/646
2013/0256939 A1 * 10/2013 Devenney ................. C04B 7/36
423/430

FOREIGN PATENT DOCUMENTS

CN        1041748 A  *  5/1990

* cited by examiner

*Primary Examiner* — Kara B Boyle
(74) *Attorney, Agent, or Firm* — Norton Rose Fulbright Canada LLP

(57) ABSTRACT

An insulation material formed of a composition, and a method of making an insulation material is provided. The composition forming the insulation material includes magnesium oxide; at least one of magnesium chloride, magnesium sulfate, and hydrates thereof; water; a foaming agent; a thickener; and a foam stabilizer. The composition is foamed to promote aeration of the composition to reduce density of the insulation material formed from the composition.

20 Claims, 9 Drawing Sheets

INSULATION MATERIAL AND METHOD OF MAKING SAME

FIELD

This relates to construction materials, and in particular, to cement insulation materials.

BACKGROUND

Aerated cement has been used as insulation; however, typical aerated cements made from Portland cement suffer from poor insulation value in comparison to other types of insulation. Aerated Portland cement insulation may have R-values <1, which makes them impractical to replace other forms of insulation material that typically have R-values >3.

SUMMARY

According to an aspect of the invention, an insulation material made from a composition is provided.

In an embodiment, the composition comprises: magnesium oxide; at least one of magnesium chloride, magnesium sulfate, and hydrates thereof; water; a foaming agent; a thickener; and a foam stabilizer. In an embodiment, the mole ratio of $MgO:MgCl_2:H_2O$ is 5-12:1:14-25. In another embodiment, the mole ratio of $MgO:MgCl_2:H_2O$ is 7.5:1:14.

In another embodiment, the insulation material has an R-values ($ft^{2.°}$ $F·h/(BTU·in)$) of greater than or equal to 3 when the insulation is 1 inch (2.54 cm) thick at room temperature.

In another embodiment, the insulation material has an R-value of greater than or equal to 4 when the insulation is at −40° C.

In another embodiment, the composition further comprises at least one of polymer, fibers, and fly ash. In an embodiment, the polymer is fibrous plastic such as poly vinyl chloride fiber.

In another embodiment, the foaming agent is a short chained alkyl ammonium chloride. The foaming agent may have a concentration of 5 wt % of the water content.

In another embodiment, the thickener is at least one of guar gum or xantham gum.

In another embodiment, the foam stabilizer is a long chain organic compound.

In another embodiment, the insulation material is sprayable.

In another embodiment, the insulation material has a density of less than or equal to 10 $lb/ft^3$.

According to another aspect of the invention, a method of manufacturing an insulating material is provided.

In an embodiment, the method comprises: providing a solution comprising: at least one of magnesium chloride, magnesium sulfate, or hydrates thereof; a foaming agent; a thickener; and a foam stabilizer; foaming the solution with a gas to provide a foamed mixture; providing a cement component mixture comprising: magnesium oxide; at least one of magnesium chloride and magnesium sulfate; and water; mixing the cement component mixture with foamed mixture to form a cementious mixture; and curing the cementious mixture. In an embodiment, the mole ratio of magnesium oxide: at least one of magnesium chloride, magnesium sulfate, and hydrates thereof: water in the cementious mixture may be 5-12:1:14-25. In another embodiment, the mole ratio of Magnesium oxide: at least one of magnesium chloride, magnesium sulfate, and hydrates thereof: water in the cementious mixture is 7.5:1:14

In another embodiment, the cement component mixture comprises at least one of polymer, fibers, and fly ash. In an embodiment, the polymer is fibrous plastic such as poly vinyl chloride fiber.

In another embodiment, the method further comprises curing the cementious mixture in a mold.

In another embodiment, the cementious mixture is cured with at least one conditions selected from 25-50% humidity, 35-50° C., curing for at least 24 hours, and curing for 1-6 days.

In another embodiment, the foaming agent is a short chained alkyl ammonium chloride.

In another embodiment, the thickener is guar gum or xantham gum.

In another embodiment, the foam stabilizer is an amphiphilic long chain organic compound.

In another embodiment, the method further comprises adding additional $MgCl_2$ to the foamed mixture.

In another embodiment, foaming the solution comprises pressurizing the solution into a foaming chamber with the gas. The foaming chamber may comprise a porous mesh to foam the solution.

In another embodiment, the method further comprising introducing a polymerization initiator to monomers in the cementious mixture to create a polymerization reaction creating a substrate on which a cement reaction occurs.

In another embodiment, the polymerization initiator may be peroxydisulfate.

In another embodiment, the monomers comprise 1,5-hexadiene, styrene, bisacrylamide and ethylene glycol.

In another embodiment, the monomers are in the foamed mixture.

In another embodiment, the polymerization initiator is in the cement component mixture.

In another embodiment, the polymerization initiator is introduced to the cementious mixture directly.

In another embodiment, the method further comprises spraying the cementious mixture.

According to another aspect of the invention, an apparatus for spraying insulation material is provided.

In an embodiment, the apparatus comprises: a gas compressor communicating with a first reservoir, a second reservoir, and a foaming chamber to provide pressurized gas to the reservoirs and foaming chamber; the foaming chamber comprising: at least one inlet for receiving a solution comprising first cement reactants from a first reservoir, and a gas from the gas compressor; and a mesh to aerate the solution with the gas forming a foamed solution; a laminar flow region to receive the foamed solution and mix the foamed solution with a mixture comprising second cement reactants to form a cementious mixture; and a nozzle to spray the cementious mixture.

DETAILED DESCRIPTION

Figure 1:
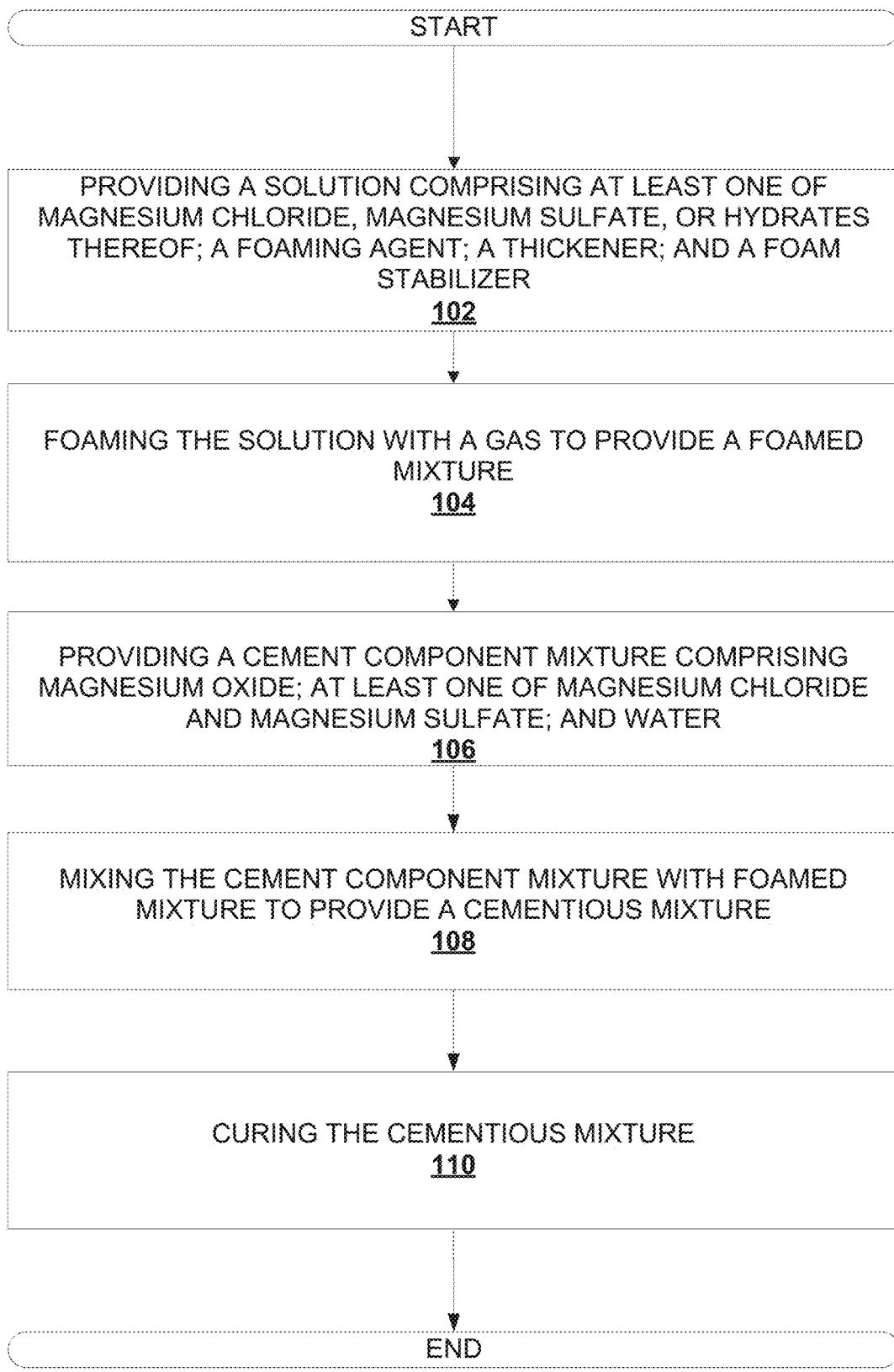
FIG. 1 depicts a method for making a non-structural insulation material according to some embodiments.

Insulation materials, such as aerated cement, are evaluated based on resistance to climate, density, toxicity, as an acoustic barrier, and R-value. Cement products tend to have a lower R-values due to their relatively high densities when compared to other insulation materials. Additionally, when cement densities are reduced to less than <0.35 g/mL they may suffer from inherent brittleness due to the large level of aeration (>85% air) required to achieve the low densities. Accordingly, an improved insulation material comprising magnesium oxide is desired to provide a R-value comparable to other types of insulation, while maintaining the characteristics of cement insulation, e.g. flame retardant, and having little or no toxicity.

In an aspect of the present invention, an insulation material comprising magnesium oxide is provided that may be recyclable, light-weight, flame retardant, mold resistance, non-toxic, acoustically/thermally insulating, and/or have moderate R-values.

The R-value is the temperature difference per unit of heat flux needed to sustain one unit of heat flux between the warmer surface and colder surface of a barrier under steady-state conditions. In the present disclosure, R-values are based on 1-inch (2.54 cm) thickness of the subject material at room temperature unless otherwise specified. In the present disclosure, reference made to inorganic salts, such as magnesium chloride and magnesium sulfate, includes the anhydrous compound as well as hydrates thereof. For example, references to magnesium chloride include magnesium chloride hexahydrate.

In an embodiment, an insulation material is formed from a composition including Magnesium Oxide (MgO); at least one of magnesium chloride, magnesium sulfate, and hydrates thereof; water; a foaming agent; a thickener; and a foam stabilizer. In an embodiment, the composition to make an insulation material may have a 5-12:1:14-31 mole ratio of $MgO:MgCl_2:H_2O$. In another embodiment, the composition has a 7.5:1:14 mole ratio of $MgO:MgCl_2:H_2O$. In another embodiment, the composition has a 5:1:24-31 mole ratio of $MgO:MgCl_2:H_2O$.

Relevant phases for Magnesium Oxychlorde (MOC) cement at room temperature are shown in equations 1-5 in Table 1, which may yield the products of magnesium hydroxide, i.e. $MgCl_2.6H_2O$, 3-phase MOC ($3MgO:MgCl_2:11H_2O$) and 5-phase MOC ($5MgO:MgCl_2:13H_2O$):

TABLE 1

| Reaction Pathways for MOC Cement | | | |
|---|---|---|---|
| (1) | $5Mg(OH)_2 \cdot MgCl_2 \cdot 8H_2O$ | $\xrightarrow{120° C.-230° C.}$ | $5Mg(OH)_2 \cdot MgCl_2 + 8H_2O$ |
| (2) | $3Mg(OH)_2 \cdot MgCl_2 \cdot 8H_2O$ | $\xrightarrow{110° C.-230° C.}$ | $3Mg(OH)_2 \cdot MgCl_2 + 8H_2O$ |
| (3) | $Mg(OH)_2$ | $\xrightarrow{332° C.}$ | $MgO + H_2O$ |
| (4) | $MgCO_3 \cdot 3H_2O$ | $\xrightarrow{157° C.-350° C.}$ | $MgO + 3H_2O + CO_2$ |
| (5) | $MgCl_2 \cdot 6H_2O$ | $\xrightarrow{117° C.-300° C.}$ | $MgCl_2 + 6H_2O$ |

The composition of the present disclosure may comprise the end-product of competing reaction pathways of equations (1)-(5) in Table 1 in combination; however, the higher proportion of 5-phase MOC, the stronger the resulting cement matrix structure produced. 5-phase MOC comprises long-needled crystal structures that are more stable and rigid than the other products of equations (1)-(5) listed above. Crystallized 5-phase MOC structure may be formed when the proportional ratio of the reactants is at least 5 mole MgO to 1 Mol $MgCl_2$, and 12 mole $H_2O$ (roughly 4 molar $H_2O$ excess is added over the required 8 moles) is added for the 5-phase MOC due to limitations in the solubility of the $MgCl_2$. Additional $H_2O$ may be provided, e.g. at mol ratio 5:1:24-31 $MgO:MgCl_2:H_2O$ to ensure that the 5-phase proportion of the product is maximized while there is sufficient water available for foaming and maximizing fire resistance.

In an example, a composition according to the present disclosure having a mol ratio 5:1:24-31 $MgO:MgCl_2:H_2O$ was dried under ambient conditions for 10 days, and maintained a 5:1:24 mol ratio of $MgO:MgCl_2:H_2O$ in the resulting cement showing improved water retention which may improve fireproofing characteristics. Accelerated drying of the samples in this example were performed to assess the amount of crystalline water versus physiosorbed water by heating the materials at 100° C. for 24 h. Water that is chemically bound generally may not be removed by temperatures of only 100° C. as they require more energy to be removed. Equations 1-5 of Table 1 show the effect of chemically bound water for the 5 competing reactions that make up the bulk of MOC composite cement matrix. Continuing the example, the sample had a water loss that reflected a drop to 5:1:22 in the mol ratio of $MgO:MgCl_2:H_2O$ which reflects a 33 wt % water content in the insulation materials. This may generally be the amount of water that would be released in the event of heat exposure or flame beyond 110° C. and continually up to 250° C.

The composition of the present disclosure may be aerated to form an aerated cement. Prior to curing, the composition may have a wet density of 20-25 pounds per cubic foot. In an embodiment, an aerated insulation material formed from the composition may have a density of less than 10 pounds per cubic foot (dry density) and may have R-values >3. In another embodiment, the insulation material may have a density of less than 9 pounds per cubic foot (dry density). R-values change inversely with temperature for inorganic based materials. In another embodiment, the R-value of the material formed from the composition is greater than or equal to 4 when the insulation is at −40° C.

In an embodiment, aggregate and/or reinforcing fibers, may be added to the composition to form an insulation material to augment the strength of the material. The aggregate (e.g. perlite, polymer, and fly ash) and/or reinforcing fibers (e.g. basalt, polypropylene, hemp and/or flax) serve to augment the strength of the insulation material. Polymer may be expanded polystyrene (EPS) which is added to improve R-value and lower weight in the form of aggregate. In an example, polyvinyl chloride (PVC) may be added to the composition to form an insulation material to augment thermal insulation efficiency, resiliency, water resistance, and compressive strength. The PVC may be PVC fibers that may act as a reinforcing material in the cement matrix. Source material for PVC may include plastic waste, e.g. from a recycling facility, window frames, and PVC pipes.

Foaming agents may be used according to the invention. The foaming agents are added to the composition to promote foaming of the composition when making the insulation material. The composition may be foamed mechanically, by gas injection, chemically, or other suitable method. The foaming agent should be suitable for foaming of high ionic strength solutions, e.g. MFX-16. In an embodiment, the foaming agent is a short chained alkyl ammonium chloride. In a further embodiment, the concentration of the foaming agent may be 5 wt % of the water content of the composition. Use of the foaming agent promotes aeration of the composition and reduction of density of the composition and insulating material formed from the composition. The foaming agent may comprise a surfactant. A surfactant has a water-soluble portion and water-insoluble portion referred to as the hydrophilic head and hydrophobic tail, respectively. This property allows for the entrapment of air molecules in water-based solutions, which are entrained by these surfactants. The surfactant may act a foaming agent and maintain the aeration of the aerated cement. In an embodiment, the surfactant is a short-chained carbon highly branched ammonium sulphate salt capable of performing in high ionic strength solutions and foaming applications.

Thickener may also be added to the composition to increase viscosity such that when the composition is aerated lower density structures can be maintained and air entrainment more complete in a closed-cell structure. In an embodiment, the thickener may be at least one of guar gum or xantham gum. In another embodiment, the thickener may be approximately 1 wt % of the composition.

The composition may also comprise foam stabilizers. In an embodiment, the foam stabilizer is a amphiphilic long chain organic compound, e.g. MFX-3. Long-chain organic compounds increase foam stability by increasing the maximum surface tension required for bubble rupture, however too long a chain can result in an increase of foam drainage and this can negatively affect foam quality. Solid additives may also be used as foam stabilizers. Solid additives may comprise minerals, low-density fillers with inorganic water glass adhesive to increase the homogeneity and stability of the foam. These additives decrease the density while bolstering the structural strength and decreasing the coalescing of bubbles. This, in turn, decreases the pore size of the foam. This reduction in pore size allows for the decrease in density without compromising the strength of the foam.

Insulation material according to the present invention may also be sprayable.

An exemplary embodiment of the composition according to the present invention is shown in Table 2.

TABLE 2

| Component | Mass (g) | Mole Ratio |
|---|---|---|
| MgO (40) | 700-900 | 7.7 |
| $MgCl_2 \cdot 6H_2O$ | 450-575 | 1.0 |
| $H_2O$ | 300-500 | 14.1 |
| Poly p-1460 | 250-350 | |
| Surfactant | 10 | |
| Expanded polystyrene | 20 | |
| Guar Gum | 5 | |
| Ground Hemp | 110 | |
| Foam Stabilizer | 50 | |
| Fly Ash | 180-220 | |

Figure 4:
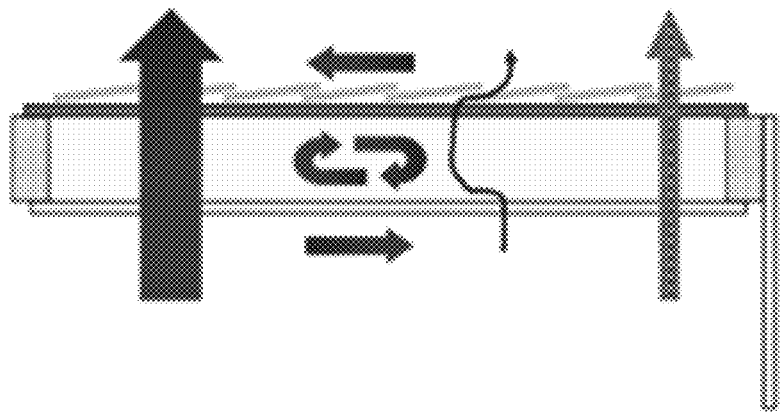
FIG. 4 illustrates heat transfer through a wall by conduction, convention, and radiation.

Embodiments according to the present disclosure were evaluated to determine how the composition performs as an insulation material for a building. In the examples below, the ability of the material to resist differences in temperature was tested. Generally, three modes of heat transfer are considered—conduction, convection and radiation (See FIG. 4). The metric RSI pertains to the ability of the material to resist the passage of heat through the material i.e. conduction by atomic motion. Using this metric alone may not reveal the true performance of a wall assembly as a insulator as other factors such as convection and density can contribute to the performance as well. Convection is the transfer of heat between a surface and a liquid or gas that can flow freely due to a temperature gradient. Convention can play a large role on the true performance of a wall assembly. Low density materials may have a lower conduction rate; however, this may inversely compares to convection as high density materials may have lower convection rates.

With reference to the method flow chart of FIG. 1, some embodiments may provide for a method of making an insulation material.

At 102, a solution is provided comprising at least one of magnesium chloride, magnesium sulfate, or hydrates thereof; a foaming agent; a thickener; a foam stabilizer; and water.

In an embodiment, the foaming agent is a short chained alkyl ammonium chloride that is suitable for foaming of high ionic strength solutions. The foaming agent may be less than or equal to 5 wt % of the water content in the solution. In another embodiment, the thickener is guar gum or xantham gum. In another embodiment, the foam stabilizer is an organic compound, e.g. an amphiphilic long chain long chain organic compound from Fusion Labs™ such as lauryl alcohol.

At 104, the solution is foamed with a gas to provide a foamed mixture. In an embodiment, the solution is foamed by pressurizing the mixture and pushing it through a foaming chamber along with a perpendicular air stream. In an embodiment, the foaming chamber contains a porous steel mesh that causes the aerated solution to foam.

In an embodiment, magnesium chloride and/or magnesium sulfate is added to the solution or to the foamed mixture to avoid excess hydration of the cement when the foamed solution is introduced to the cement containing stream.

At 106, a cement component mixture is provided comprising magnesium oxide, at least one of magnesium chloride and magnesium sulfate; and water. In an embodiment, the cement component mixture further comprises polymer, fibers and fly ash.

At 108, the cement component mixture is mixed with the foamed mixture to provide a cementious mixture. The cement component mixture and the foamed mixture may be mixed in a high or low sheer mixer to obtain a homogeneous cementious mixture. In the cementious mixture, the combination of magnesium oxide with at least one of magnesium chloride, magnesium sulfate, and hydrates thereof, creates a reaction to form cement.

In an embodiment, the mole ratio of magnesium oxide: at least one of magnesium chloride, magnesium sulfate, and hydrates thereof; water in the cementious mixture is 5-12:1:14-25. In another embodiment, the mole ratio of magnesium oxide: at least one of magnesium chlorate, magnesium sulfate, and hydrates thereof: water in the cementious mixture is 7.5:1:14.

At 110, the cementious mixture is cured. The cementious mixture may be cured in a mould (e.g. a mould for a cement block). In an embodiment, the cementious mixture is cured with at least one of the conditions selected from 35-50° C., approximately 100% humidity, 25-50% humidity, and 1-10 days. The cured aerated concrete may then be demoulded and cut or milled to specification.

Figure 5:
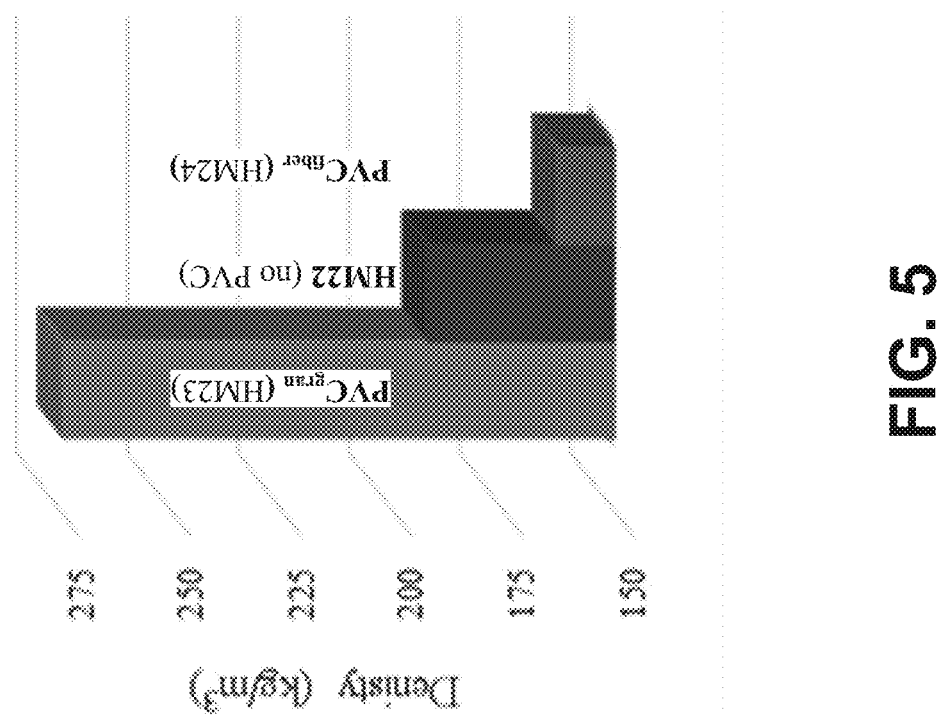
FIG. 5 is a graphical illustration of granulated and fiberous polyvinyl chloride content correlated to measured density of a non-structural insulation material according to an embodiment.

In an embodiment, the solution may comprise PVC which may be granulated and/or fiber PVC. Granulated PVC ($PVC_{gran}$) may be 1.0 mm in diameter and irregularly shaped. PVC fiber (PVC) ran, fiber, strands may be generated by shaving PVC (e.g. plastic pipes/window frames) using a saw blade. In an example, the effect of $PVC_{gran}$ and $PVC_{fiber}$ on density of a cured cementious mixture according to the present disclosure is shown in FIG. 5. In this example, the series of samples included HM22 (no PVC), HM23 (PVC) and HM24 ($PVC_{fiber}$) with 2 wt %, where each sample in the series was created from the gran, same solution. Table 3 summarizes the results of this sample series. HM23 had a higher final density of 274.4 kg/m³ than HM22, at 192.1 kg/m³. In addition, HM23 had a lower RSI of 13.6 mKW$^{-1}$ in comparison to HM22 at 16.0 mKW$^{-1}$. As such, $PVC_{gran}$ may decrease the performance of a resulting cement foam. $PVC_{fiber}$ was the next iteration for integrating plastic waste into the solution. The fibrous PVC was finer in diameter and lighter in density. Table 3 shows the results of HM24, which has 2 wt % $PVC_{fiber}$—an equivalent volume when compared to the 4 wt % $PVC_{gran}$ addition of HM21. The final density of HM24 was 162.8 kg/m³ and the thermal resistance was 17.9 mKW$^{-1}$. As such, fibrous plastic may provide reduced density while increase RSI.

TABLE 3

Results of the addition of PVC to Aerated Cement Foam.

| | Density (kg/m3) | PVC (wt %) | RSI (mKW$^{-1}$) |
| --- | --- | --- | --- |
| HM22 | 192.1 | 0.0 | 16.0 |
| HM23 | 274.4 | 3.7[1] | 13.6 |
| HM24 | 162.8 | 2.1[2] | 17.9 |

In an example, curing conditions for the cementious mixture were explored to understand its effect, if any, on structural characteristics as well as to understand the potential for production of cement foam in an onsite application. A series of tests were conducted with varying conditions to determine a minimum length of days required to cure a sample to an acceptable stable structure. Samples "HM31A", "HM31B", and "HM31C" were made from the same initial batch of cementitious mixture to determine which sealing strategy resulted in optimum performance in thermal resistance and compressive strength. Sealing the foam would create an internal relative humidity (RH) of 100% versus a curing chamber that operated at RH 50±2%, and in both cases the temperature were held at 22±3° C. Humidity may be a condition that accelerates the curing process. Continuing the example, all three samples "HM31A", "HM31B", and "HM31C" had the same composition and were cured for 5 days in sealed and unsealed conditions. HM31A was sealed for day 1 of curing and unsealed for days 2-5, HM31B was unsealed for days 1-5, and HM31C was unsealed for day 1, sealed for days 2-4 and unsealed for day 5. The conditions for HM31C were to mimic the ability to insulate a wall via spray foam cement according to the present disclosure that would then be sealed after the first day of setting by drywall or some other finishing material; however on day 4 it was observed the foam was not drying sufficiently so we unsealed the sample. Table 4 shows the compressive strength results of these samples, evaluated after the 5 days of curing in the 3 different methods to demonstrate the effect on structural strength. The results showed that HM31A yielded a ~20% increase in compressive strength. The results also showed that when comparing HM31B and HM31C, there was no statistically significant difference in strength. This may indicate that the first day of curing is crucial for ensuring RH is at a maximum to yield the most robust foam sample.

TABLE 4

Compressive strength comparison of varying curing conditions. (No PVC Added)

| | Density (kg/m³) | Water content (wt %) | Ultimate Compressive Strength (N) |
| --- | --- | --- | --- |
| HM31A | 174.6 | 28.0 | 595 |
| HM31B | 195.1 | 31.3 | 509 |
| HM31C | 182.9 | 29.3 | 465 |

Figure 6:
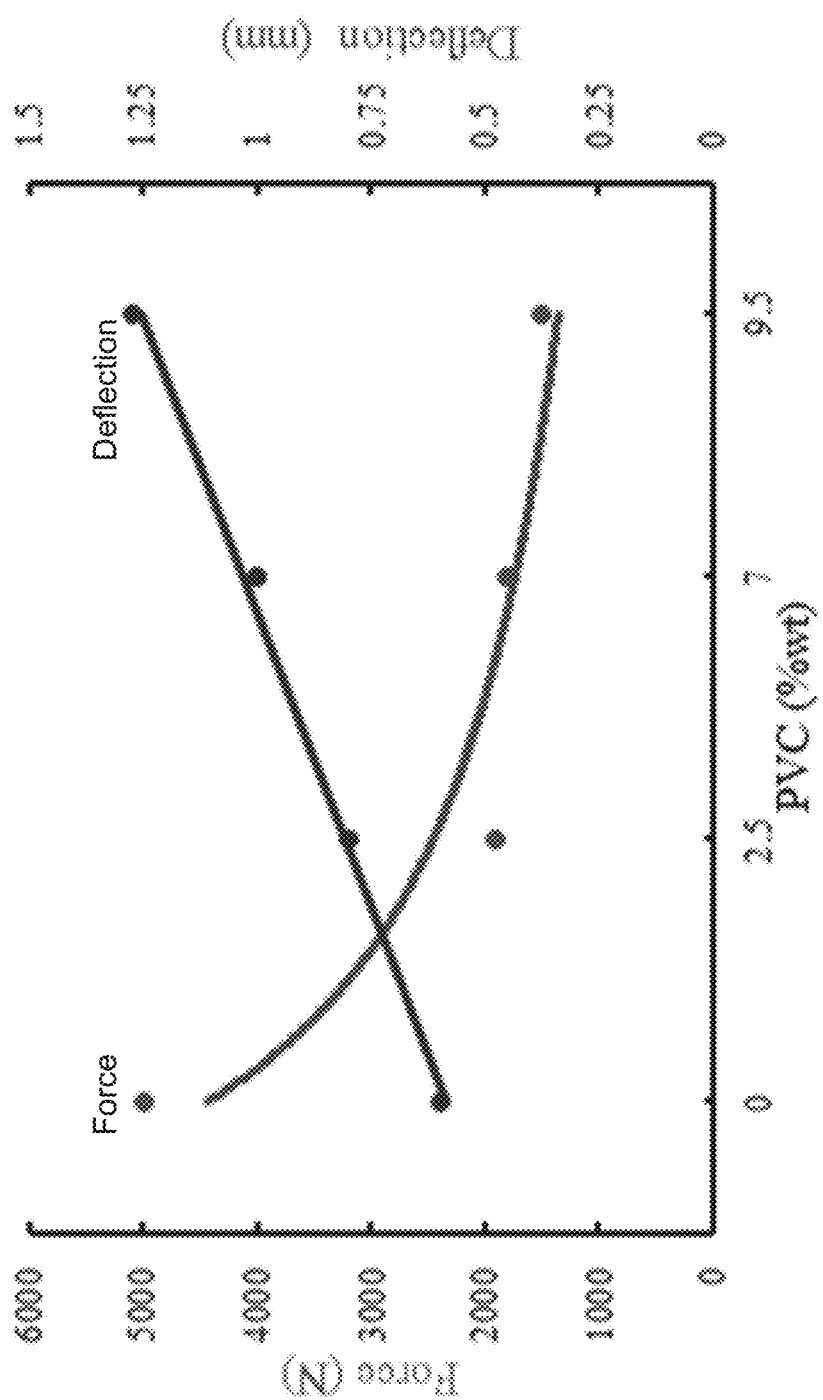
FIG. 6 is a graphical illustration of polyvinyl chloride content correlated to measured compressive strength and deflection in a non-structural insulation material according to an embodiment.

Introduction of $PVC_{fiber}$ into the samples and evaluation of compressive strength was performed on the "HM44" series in which each of the HM44 series of sample were dried in an oven at 100° C. for 5 hours. FIG. 6 illustrates the compressive strength and deflection measurement for the HM44 series, showing that the impregnation of PVC into the MgO composite had a detrimental effect on the compressive strength that followed an exponential decay; however, no significant difference was observed beyond PVC 2.5% and PVC 9.5%. The benchmark sample HM44A showed a 5000 N compressive strength that dropped to 1900N in HM44B upon introduction of PVC. The compressive strength did not decrease further beyond this threshold on further addition of PVC, however the deflection continued to improve with the addition of more PVC. The elastic compressibility of the sample improved linearly with the addition of PVC, which suggests the samples may be less rigid however less prone to cracking. Table 5 illustrates the $PVC_{fiber}$ content in each of the HM44 series and corresponding density, RSI measurement, and Normalized RSI (to account for varying density between samples).

TABLE 2

Samples series investigating loading of PVC into Aerated Cement and corresponding RSI.

| | PVC (wt %) | Final Density (kg/m$^3$) | RSI (mKW$^{-1}$) | Normalized RSI (mKW$^{-1}$) |
|---|---|---|---|---|
| HM44A | 0.0 | 264.7 | 12.2 | 20.0 |
| HM44B | 2.5 | 281.6 | 9.8 | 16.1 |
| HM44C | 4.8 | 362.9 | 10.8 | 17.9 |
| HM44D | 7.1 | 295.1 | 13.7 | 22.6 |
| HM44E | 9.5 | 271.2 | 14.0 | 23.1 |
| HM45C | 1.6 | 172.5 | 18.3 | 16.6 |
| HM45D | 2.7 | 180.4 | 18.6 | 16.4 |
| HM45E | 5.0 | 155.1 | 18.7 | 17.5 |

Figure 7:
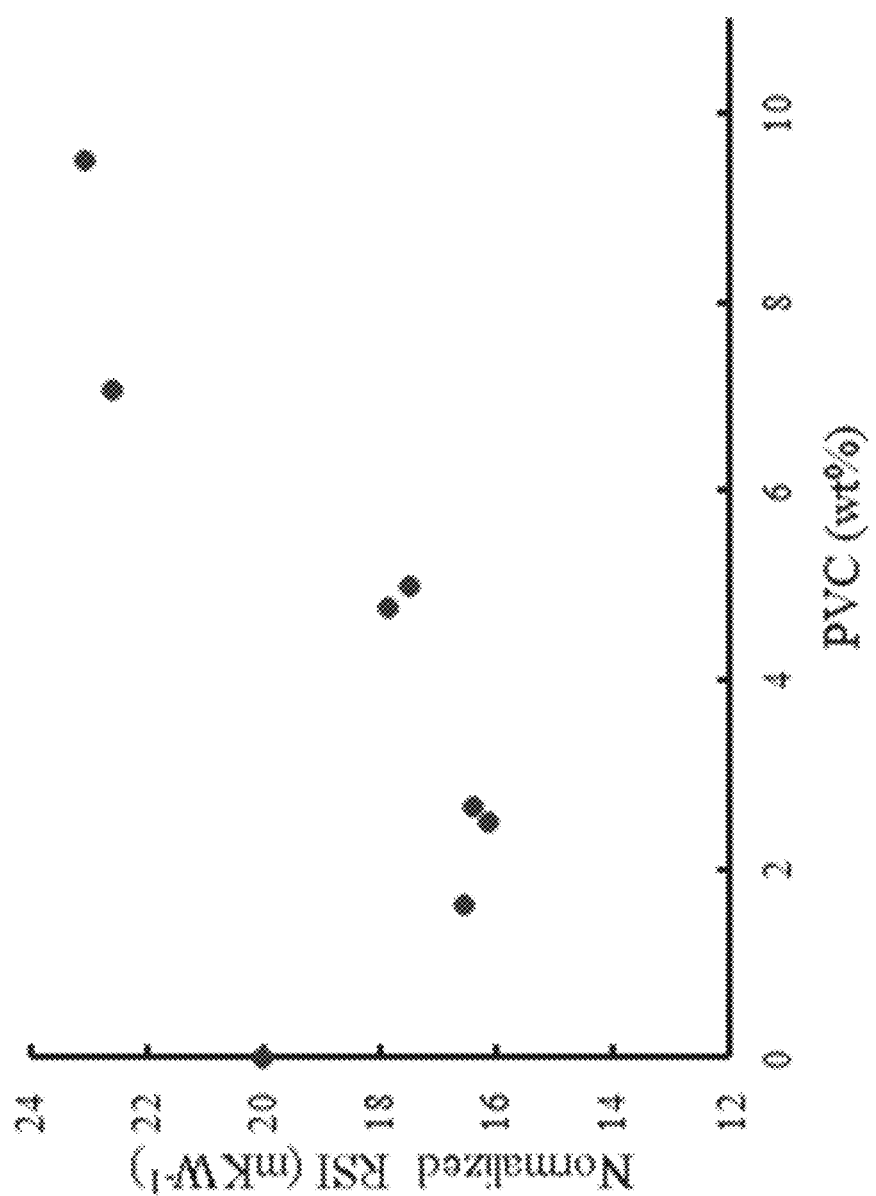
FIG. 7 is a graphical illustration of polyvinyl chloride content correlated to measured (normalized) RSI according to an embodiment.

FIG. 7 illustrates the normalized RSI value in comparison to PVC (wt %) between samples in the HM44 series. As shown, increasing PVC$_{fiber}$ content increases the RSI value and the ability of material to perform as a thermal insulator at higher PVC loading. Beyond 10 wt % PVC loading the material becomes volumetrically mostly plastic.

Figure 8:
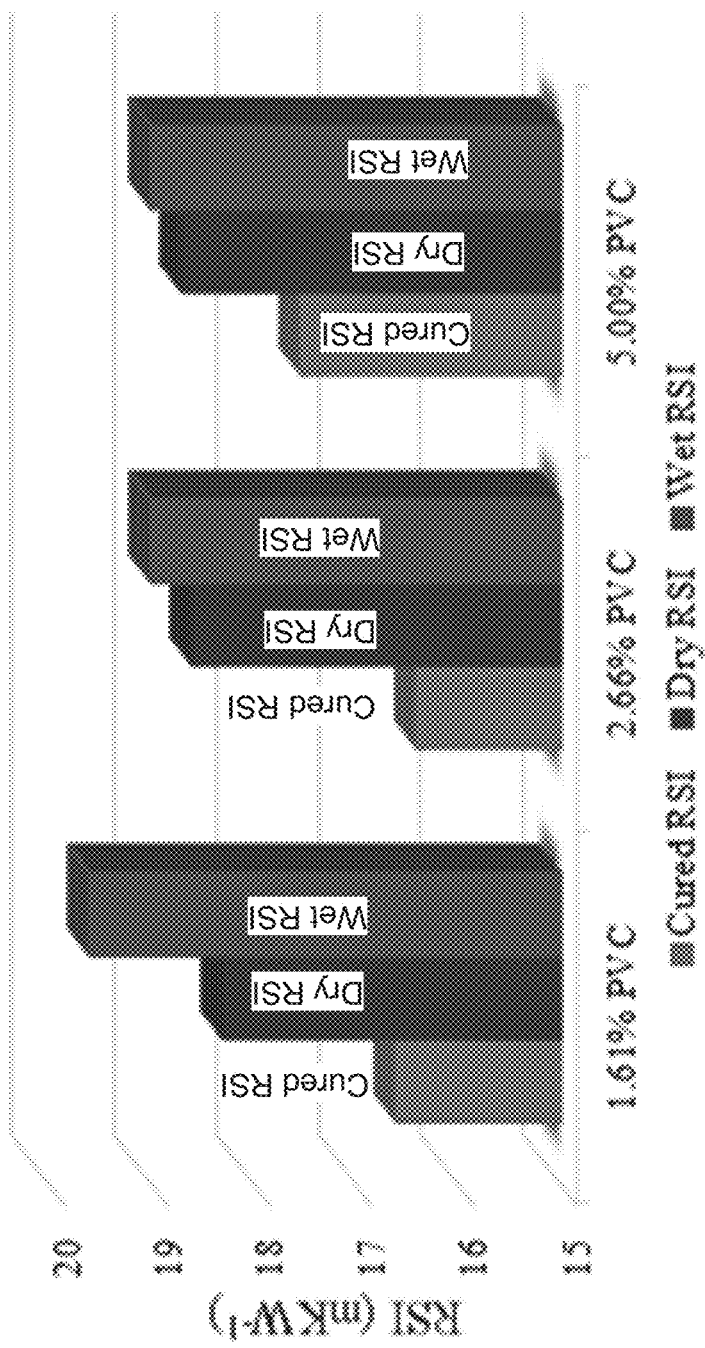
FIG. 8 is a graphical illustration of polyvinyl chloride content correlated to experimental data for measured RSI for cured, dry, and wet embodiments.

FIG. 8, illustrates the water resistance ability of PVC infused samples. The thermal resistance of HM45C, HM45D, and HM45E were evaluated after curing, and then separately after being submerged in water for 1 hour and after dried in the oven at 100° C. for 5 h. The thermal resistance of the submerged and dried samples were measured and compared. As shown, PVC$_{fiber}$ loading increase to 5 wt % resulted in a more stable RSI.

Figure 9:
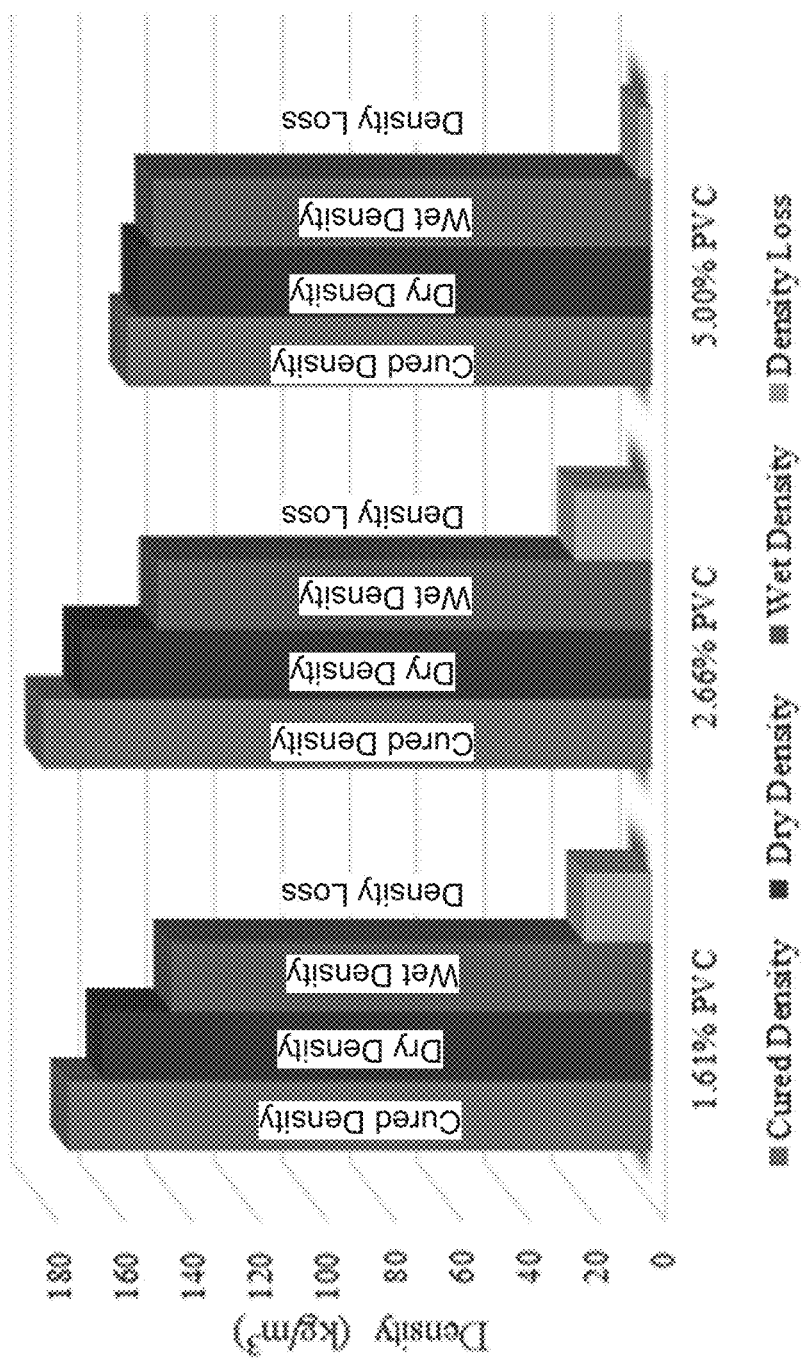
FIG. 9 is a graphical illustration of polyvinyl chloride content correlated to experimental data for measured RSI for cured, dry, and wet embodiments.

The mass loss of water absorption was also evaluated for HM45C, HM45D, and HM45E, which is illustrated in FIG. 9. The change in mass (density loss) between the cured samples also reflects the stability of the sample. The results demonstrate that the samples had a higher thermal resistance post water submergence, and a clear decrease in the mass loss with increasing PVC$_{fiber}$ content.

The insulation material according to the present invention may also be sprayable. This embodiment involves a reaction involving a rapid polymerization in addition to the cementing reaction described above. In an embodiment, the polymerization reaction is a radical polymerization reaction involving an polymerization initiator, e.g. peroxodisulfate, and monomers. The monomers may be for example 1,5-hexadiene, styrene, bisacrylamide and ethylene glycol. Boronic acid may be present as a crosslinker. The polymerization reaction occurs rapidly in order to act as a substrate for the cement reaction to occur. The reactants of the polymerization reaction are reacted in the cementitious mixture, yet may be added individually to the cementitious mixture, and/or separately added to the foamed mixture or cement component mixture such that the polymerization reaction can occur when the foamed mixture or cement component mixture are mixed together. The polymerization reaction may also take place in the presence of a catalyst such as triethanolamine. In an embodiment, the catalyst is in the foaming mixture with the monomers. In embodiment, the polymerization initiator is included in the cement mixture or can be added independently to the cementitious mixture.

Figure 2:
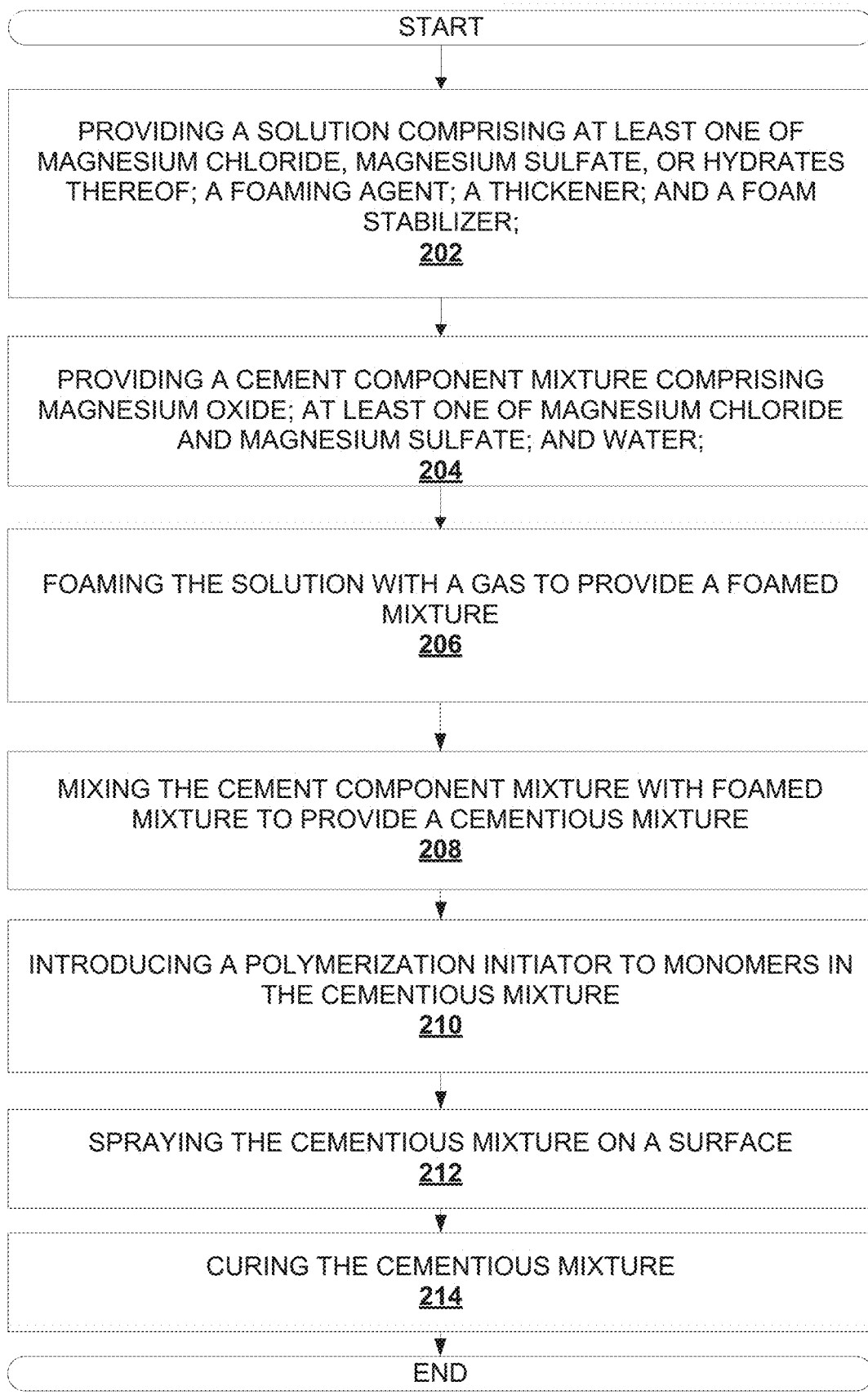
FIG. 2 depicts a method for making a non-structural insulation material according to some embodiments.

With reference to the method flow chart of FIG. 2, some embodiments may provide for a method of making an insulation material.

At 202, a solution is provided comprising at least one of magnesium chloride, magnesium sulfate, or hydrates thereof; a foaming agent; a thickener; and a foam stabilizer. In an embodiment, the foaming agent is a short chained alkyl ammonium chloride that is suitable for foaming of high ionic strength solutions. The foaming agent may be less than or equal to 5 wt % of the solution. In another embodiment, the thickener is guar gum or xantham gum. In another embodiment, the foam stabilizer is an organic compound, e.g. an amphiphilic long chain organic compound from Fusion Labs™ such as lauryl alcohol. In an embodiment, the solution may comprise PVC (such as PVC$_{fiber}$).

At 204, a cement component mixture is provided comprising magnesium oxide, magnesium chloride; and/or magnesium sulfate; and water. In an embodiment, the cement component mixture further comprises polymer, fibers and fly ash.

At 206, the solution is foamed with a gas to provide a foamed mixture. In an embodiment, the solution is foamed by pressurizing the mixture and pushing it through a foaming chamber along with a perpendicular air stream. In an embodiment, the foaming chamber contains a porous steel mesh that causes the aerated solution to foam.

In an embodiment, magnesium chloride and/or magnesium sulfate is added to the solution or to the foamed mixture to avoid excess hydration of the cement.

At 208, the cement component mixture is mixed with the foamed mixture to provide a cementitious mixture. The cement component mixture and the foamed mixture may be mixed in a high or low sheer mixer to obtain a homogeneous cementitious mixture. In the cementitious mixture, the combination of magnesium oxide with at least one of magnesium chloride, magnesium sulfate, and hydrates thereof, creates a reaction to form cement.

In an embodiment, the mole ratio of magnesium oxide; at least one of magnesium chloride, magnesium sulfate, and hydrates thereof; and water in the cementitious mixture is 5-12:1:14-25. In another embodiment, the mole ratio of magnesium oxide; at least one of magnesium chlorate, magnesium sulfate, and hydrates thereof; and water in the cementitious mixture is 7.5:1:14.

At 210, a polymerization initiator is introduced to monomers in the cementitious mixture to initiate the polymerization reaction. The monomers may be in the foaming solution, the cement component mixture, or introduced to the cementitious mixture separately. Similarly, the initiator may be in the foaming solution, the cement component mixture, or introduced to the cementitious mixture separately such that the polymerization reaction occurs in the cementitious mixture to form a substrate on which the cement mixture may occur.

At 212, the cementitious mixture may then be sprayed onto a surface at a desired location.

At 214, once sprayed on a surface the cementitious mixture is cured to provide an aerated insulation material. When curing, the insulation material may be dehumidified and kept warm to allow the insulation material to set.

Figure 3:
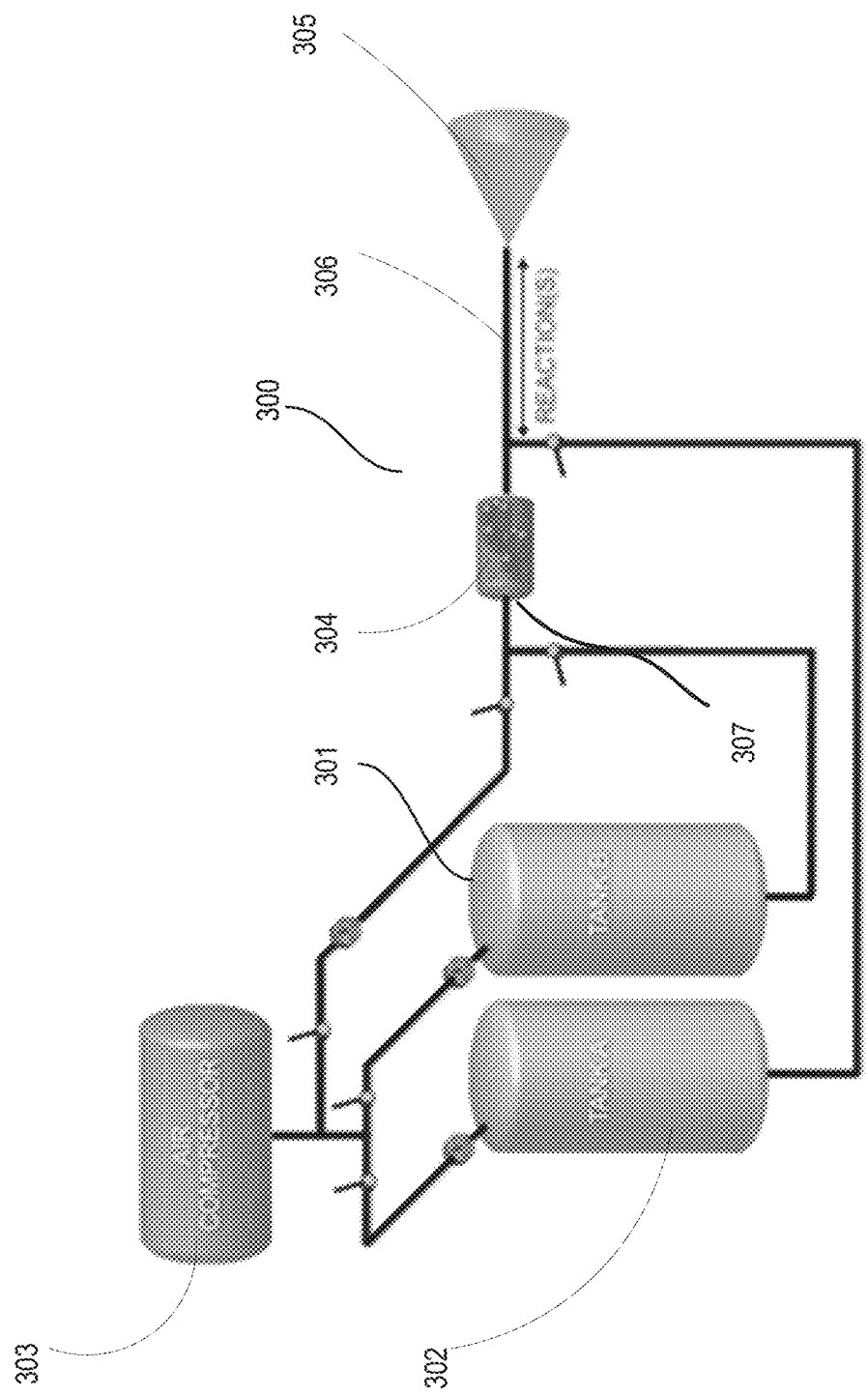
FIG. 3 illustrates an apparatus for spraying insulation material according to an embodiment.

With reference to FIG. 3, an embodiment of an apparatus 300 for spraying insulation material is illustrated.

As shown in FIG. 3, a gas compressor 303 communicates with a first reservoir 301, a second reservoir 302, and a foaming chamber 304 to provide pressurized gas to the reservoirs 301, 302 and foaming chamber 304. Gas compressor 303 may be a compressor, pump, or other suitable apparatus for providing compressed gas.

Foaming chamber 304 includes at least one inlet 307 for receiving a solution which comprises first cement and polymerization reactants from a first reservoir, e.g. the solution discussed at 202 above. The at least one inlet 307 of the foaming chamber may also receive a gas from gas compressor 303. Foaming chamber 304 comprises a mesh (not shown) to aerate the solution with the gas forming a foamed solution. The mesh may be a porous steel mesh.

Laminar flow region 306 communicates with foaming chamber 304 to receive the foamed solution, and second reservoir 302 to receive second cement and polymerization reactants, e.g. the cement component mixture at 204 above. In an embodiment, laminar flow region 306 may also communicate with a source for a polymerization initiator. Cement and polymerization reactions take place in the laminar flow region to create cementious mixture that may set up rapidly upon being sprayed from nozzle 305.

EXAMPLES

Two example methods were tested to produce the MgO composite materials, listed below as Method 1 and Method 2.

Method 1

$MgCl_2.6H2O$ (203.21 g; 1 mol) is added to a mixing chamber with the minimum amount of water to reach complete saturation (127 mL; 7 mol). This solution is gently heated and mechanically stirred for 1 h to 40° C. and then cooled to room temperature. While under mechanical stirring the powdered MgO (201.15 g; 5 mol) cement is slowly added to the solution and the stirring rate is increased to begin to induce aeration. Liquid additives in the form of foaming agents, viscosifiers and foam stabilizers are added, and the solution begins to foam (quantities vary). After approximately 10 min the solid additives are added slowly, and intermittent mixing is provided over the next 1 h. The foamed solution is then transferred into a mould and placed in the curing chamber.

Method 2

$MgCl_2.6H2O$ (203.21 g; 1 mol) is added to a mixing chamber with the minimum amount of water to reach complete saturation (127 mL; 7 mol). This solution is gently heated and mechanically stirred for 1 h to 40° C. and then cooled to room temperature. While under mechanical stirring the powdered MgO (201.15 g; 5 mol) cement is slowly added to the solution and the stirring rate is increased to begin to induce aeration. Liquid additives in the form of viscosifiers and foam stabilizers are added, and the solution is stirred but remains unaerated (quantities vary). After approximately 10 min the solid additives are added slowly, and intermittent mixing is provided. In a separate vessel a foaming solution is prepared by addition of a surfactant at 10 wt % to water and a foam is produced by a custom-made foaming apparatus. The foaming apparatus consists of a porous media in a foaming chamber into which air and foaming solution are introduced and the foamed stream is added directly into the mixing chamber. over the next 1 h. The foamed solution is then transferred into a mould and placed in the curing chamber.

Curing Conditions

The curing chamber was a custom designed climate chamber that has the operational capacity to run between RH 25-75% and temperature 18-40° C. It has a humidifier and independent heating system that are digitally monitored by dual sensor that displays real time data. Samples were isolated in this chamber on a series of shelves and the air in the chamber circulated by a few small computer fans that were retrofitted to the box.

Plastic Processing $PVC_{fiber}$ described herein was fiberized by hand using a table saw with a feeder that slowly applied pressure to the waste plastic. Plastic off cuts were collected by vacuum and kept sealed until use. $PVC_{gran}$ was processed by a third party, Orenda Automation™ in Markham, Ontario and is sold as a recycled PVC.

Analytical Method:

Thermal Conductivity

Samples described herein were prepared by leveling and cutting raw blocks into 30.5 cm width, 30.5 cm length, and 2.54-5.08 cm in height. This sample size is fixed based on the requirements of the Heat Flow Meter (HFM) 436 Lambda from Netzch and ASTM C518. The procedure follows the requirements for steady-state thermal transmission properties by means of the heat flow meter apparatus and is the accepted standard in the industry.

Compressive Strength

Samples described herein were prepared for standard 15.24 cm by 15.24 cm and 1.50 cm thick. Tinius Olsen Electromechanical Universal Testing Machine was used to evaluate the compressive strength of the insulation material following the requirements for ASTM C165 to evaluate compressive properties of thermal insulation.

Foaming Apparatus

Foaming Apparatus shown in FIG. 3 used to produce the foam that was added into the cement slurry to aerate. Air compressor was run at 25-50 psi and foaming agent/solution run at approximately 30 psi. Foaming chamber 304 was horizontal with high porous metallic media to generate mixing of perpendicular air and foaming solution (reservoir 301). In some configurations a second tank could be used to crosslink the foam before injection.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the detailed embodiments described above and illustrated are intended to be examples only. The invention is defined by the appended claims.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An insulation material formed of a composition, the composition comprising:
   magnesium oxide;
   at least one of magnesium chloride, magnesium sulfate, and hydrates thereof;
   water;
   a foaming agent;
   a thickener;

a foam stabilizer;
a plurality of polymer fibers; and
wherein mole ratio of $MgO:MgCl_2:H_2O$ is 5-12:1:14-31, wherein the mole ratio includes hydrates.

2. The material of claim 1, wherein the insulation material has at least one of an R-value of greater than or equal to 3 when the insulation is 1 inch (2.54 cm) thick at room temperature, and/or the insulation material has an R-value of greater than or equal to 4 when the insulation is at −40° C.

3. The material of claim 1, comprising at least one of fibers and fly ash.

4. The material of claim 1, wherein the plurality of polymer fibers are PVC fibers.

5. The material of claim 1, wherein the foaming agent is an alkyl ammonium chloride; optionally the foaming agent has a concentration of less than or equal to 5 wt % of the water content.

6. The material of claim 1, wherein the thickener is at least one of guar gum or xantham gum.

7. The material of claim 1, wherein the foam stabilizer is an amphiphilic organic compound.

8. An insulation material formed of a composition, the composition comprising:
magnesium oxide;
at least one of magnesium chloride, magnesium sulfate, and hydrates thereof;
water;
a foaming agent;
a thickener; and
a foam stabilizer
wherein the foaming agent is an alkyl ammonium chloride; optionally the foaming agent has a concentration of 5 wt % of the water content.

9. A method of manufacturing an insulating material, the method comprising:
providing a solution comprising:
at least one of magnesium chloride, magnesium sulfate, or hydrates thereof;
a foaming agent;
a thickener;
a plurality of polymer fibers;
a foam stabilizer; and
water;
foaming the solution with a gas to provide a foamed mixture; optionally adding additional $MgCl_2$ to the foamed mixture;
providing a cement component mixture comprising:
MgO;
at least one of $MgCl_2$; $MgSO_4$;
$H_2O$;
mixing the cement component mixture with foamed mixture to form a cementious mixture, wherein the mole ratio of magnesium oxide, magnesium chloride, and water in the cementious mixture is 5-12:1:14-31, wherein the mole ratio includes hydrates; and
curing the cementious mixture.

10. The method of claim 9, wherein the cement component mixture comprises at least one of fibers and fly ash.

11. The method of claim 9, wherein the plurality of polymer fibers are PVC fibers.

12. The method of claim 9, wherein the cementious mixture is cured with at least one conditions selected from 25-50% humidity, 100% humidity, 35-50° C., curing for at least 24 hours, and curing for 1-6 days.

13. The method claim 9, wherein the foaming agent is an alkyl ammonium chloride.

14. The method of claim 9, wherein the thickener is guar gum or xantham gum.

15. The method of claim 9, wherein the foam stabilizer is an amphiphilic organic compound.

16. The method of claim 9, wherein foaming the solution comprises pressurizing the solution into a foaming chamber with the gas.

17. The method of claim 9, comprising introducing a polymerization initiator to monomers in the cementious mixture to create a polymerization reaction creating a substrate on which a cement reaction occurs.

18. The method of claim 17, wherein the polymerization initiator is peroxydisulfate.

19. The method of claim 17, wherein the monomers comprise 1,5-hexadiene, styrene, bisacrylamide and ethylene glycol.

20. The method of claim 17, wherein the polymerization initiator is in the cement component mixture or is introduced to the cementious mixture directly.

* * * * *